June 24, 1924.

J. W. BROWN 1,498,538

COMBINED LEVEL AND INCLINOMETER

Filed July 24, 1922

Inventor

James W. Brown.

By Lacey & Lacey, Attorneys

Patented June 24, 1924.

1,498,538

UNITED STATES PATENT OFFICE.

JAMES W. BROWN, OF OTSEGO, MICHIGAN.

COMBINED LEVEL AND INCLINOMETER.

Application filed July 24, 1922. Serial No. 577,259.

*To all whom it may concern:*

Be it known that I, JAMES W. BROWN, a citizen of the United States, residing at Otsego, in the county of Allegan and State of Michigan, have invented certain new and useful Improvements in Combined Levels and Inclinometers, of which the following is a specification.

This invention has as its general object to provide an improved level and inclinometer adapted for general use in determining the angle of inclination of structural parts or the like or their disposition with relation to the horizontal.

One of the primary objects of the present invention is to provide an instrument of this type extremely simple in construction, accurate in the performance of its functions and adapted to be readily consulted when applied to the work.

Figure 1:
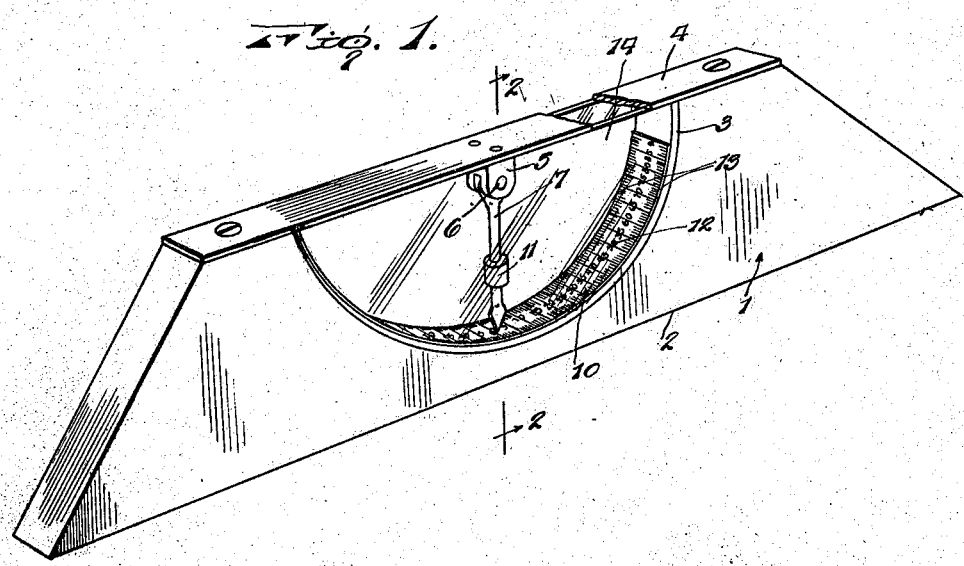
Figure 1 is a perspective view of the instrument embodying the invention.
Figure 2:
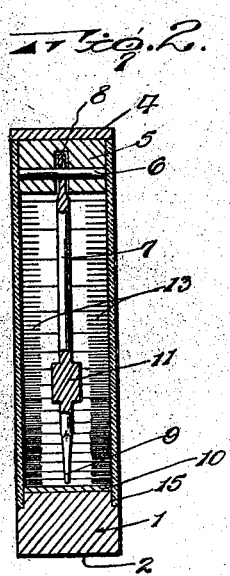
Fig. 2 is a vertical transverse sectional view on the line 2—2 of Fig. 1 looking in the direction indicated by the arrows.

The instrument comprises a stock which is indicated in general by the numeral 1 and which may be of wood, metal, or any other material suitable for the purpose and which may be of oblong rectangular form or of the form shown in Fig. 1. The stock 1 is provided with a straight basal edge 2 adapted to be disposed against the work the inclination of which is to be determined, and at a point preferably midway between its ends the stock is formed with a substantially semi-circular recess 3 opening through its opposite or upper edge and through its opposite faces. The numeral 4 indicates a plate which is disposed and secured upon the upper edge of the stock and which extends across the open upper side of the recess 3. At a point concentric to the arcuate wall of the recess 3, the plate 4 is provided with pivot ears 5 which project from its under side and support between them a pivot pin 6. The numeral 7 indicates a pointer which is pivotally mounted at its upper end, as at 8, upon the pin 6 between the ears 5, and this pointer is provided at its lower end with a tapered tip 9 designed to register at its extremity with the marks of a scale 10 which may be located directly upon the surface of the arcuate wall of the recess 3 or upon an arcuate strip mounted upon the said face of the wall. Preferably the shank of the pointer 7 is provided with an enlargement 11 either integral therewith or applied thereto and constituting a weight for steadying the movement of the pointer about the pivot pin 6. The scale 10 is graduated in degrees of a circle and it will therefore be evident that, with the parts properly fixed and adjusted, the extremity of the pointer will register with the zero mark of the scale 10 when the basal edge of the stock of the instrument is disposed upon a surface which is truly level. If the surface is inclined, the extremity of the said pointer will register with some other one of the scale marks to indicate the angle of inclination of the surface.

Preferably the scale 10 embodies degree designating ordinals indicated by the numeral 12 and arranged in a series longitudinally of the arcuate wall of the recess 3 or the scale strip upon said wall and extending between spaced series of scale marks 13 located substantially at the margins of said wall or strip, as the case may be. In order that the scale may be viewed from either side of the stock and the pointer 7 yet protected from contact with objects, substantially semi-circular glass panes 14 are disposed at opposite sides of the recess 3 as clearly shown in the drawings and are seated at their arcuate edges in rabbets 15 formed in the opposite faces of the stock and at their chordal edges against the underside of the plate 4.

Figure 3:
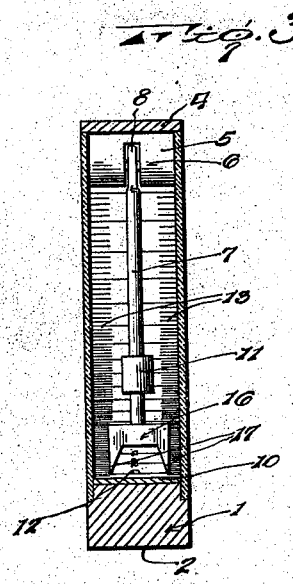
Fig. 3 is a view similar to Fig. 2 illustrating a modified form of the invention.

In the above described embodiment of the invention the pointer 7 is provided with a single tip which moves in a path substantially as defined by the line of ordinals 12, but it may be preferred to provide the pointer with a tip of the construction shown in Fig. 3 of the drawings, this tip, indicated by the numeral 16, being provided with two spaced indicating points or terminals 17 designed for substantial registration with the two series of scale marks 13. The advantage of this construction resides in the fact that the two terminals or points 17 register with the respective scale marks so that a more accurate reading may be obtained from either side of the instrument and particularly where the pointer indicates degrees intermediate the scale marks designated by the ordinals "5", "10", and so forth,

Having thus described the invention, what is claimed as new is:

An instrument of the class described comprising a stock having a straight basal edge, the stock being provided in its upper side with a substantially semi-circular recess, the arcuate wall of the recess being rabbeted at the opposite faces of the stock, substantially semi-circular panes of transparent material disposed within the opposite side of the recess with their arcuate edges seating in the rabbets and with their chordal edges substantially in the plane of the upper edge of the stock, a supporting plate secured upon the upper edge of the stock and spanning the recess and engaging at its under side with the said upper edges of the panes, an arcuate scale upon the arcuate wall of the recess, and an indicator element pivotally suspended from the supporting plate and having an indicating terminal moving in proximity to the said scale.

In testimony whereof I affix my signature.

JAMES W. BROWN. [L. S.]